Nov. 5, 1946.  D. H. SAYWARD  2,410,686
DOUBLE CALIPERS
Filed April 18, 1944
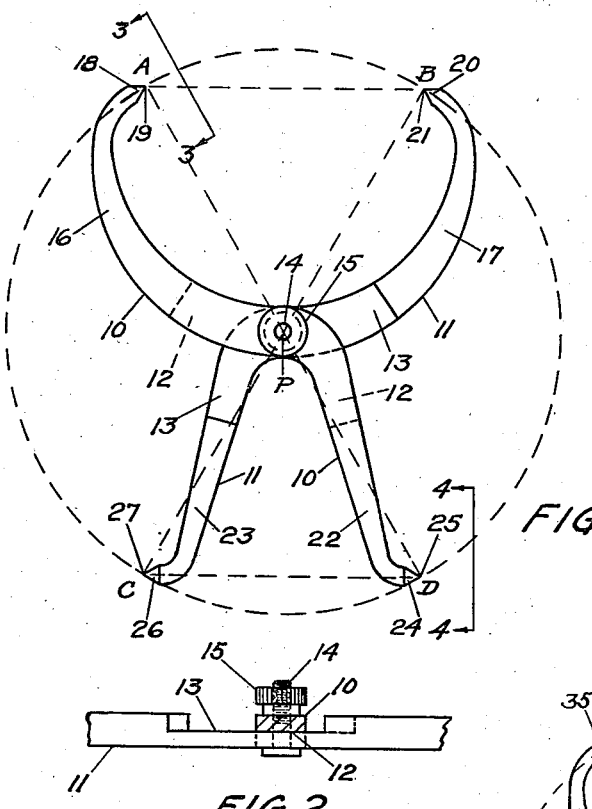
FIG. 1
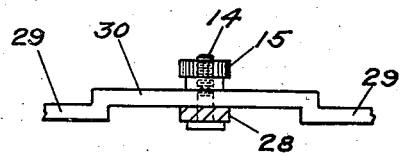
FIG. 2
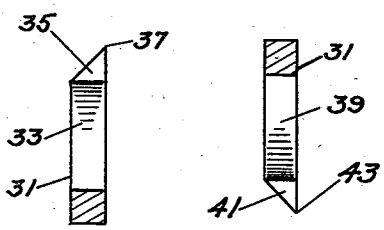
FIG. 5
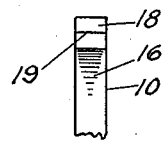
FIG. 3
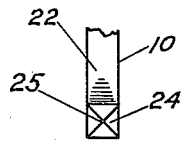
FIG. 4
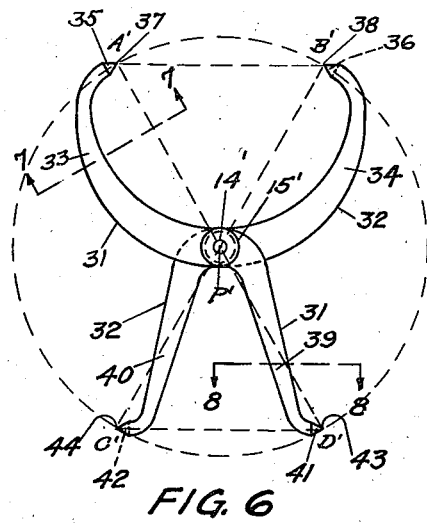
FIG. 6
FIG. 7   FIG. 8
INVENTOR
DWIGHT H. SAYWARD
BY Robert B. Outerbridge
HIS ATTORNEY Patented Nov. 5, 1946

2,410,686

UNITED STATES PATENT OFFICE 2,410,686

DOUBLE CALIPERS

Dwight H. Sayward, Cape Elizabeth, Maine

Application April 18, 1944, Serial No. 531,553

5 Claims. (Cl. 33—149)

The present invention relates to geometrical instruments and more particularly to calipers. Specifically, the present invention relates to calipers of the combined inside and outside type, sometimes referred to as double calipers.

This combined type of caliper is a convenient tool to use because it unites in one instrument means for gauging or measuring both inside and outside dimensions without the chance of separate inside or outside calipers being out of reach or mislaid when needed and also without the expense involved in providing two such separate calipers. But combined inside and outside calipers marketed today are characterized by the fact that while movement of the pivotally connected body members to effect a spacing between the work-contact ends of the outside calipering legs, for example, also effects a spacing between the work-contact ends of the inside calipering legs, the two spacings are unequal, so that the utility of the combined tool is really confined to a matter of convenience in having at hand what is nothing more than two tools in one.

Stating this last differently, if it be desired to make a gauging comparison between the diameter of a shaft, for example, and the diameter of a cylindrical bore being turned and into which the shaft is to fit properly, it is necessary, after first engaging the shaft diameter with the outside caliper leg ends and then placing them on a scale to get an eye measurement reading of the spacing between them, to move the body members of the combined inside and outside calipers, or to move the legs of a separate inside caliper, and lay the inside leg ends against the scale with further eye measurement reading and likely further leg movement until the inside leg ends have the same spacing as previously ascertained from the scale, whereupon the diameter of the bore may be gauged.

Beside the fact that the making of this comparison in this manner affords two opportunities for inaccuracy in making the adjustments of the two types of legs, there is the further disadvantage that more time is consumed than need be not only because two calipers must be handled, or a combined caliper handled twice, to transfer to the ends of the inside legs the spacing between the ends of the outside legs but also because an additional tool, a scale, must be employed, although the function of the scale here is merely to serve as a gauge for leg-setting, the actual distance indicated by the scale being unimportant.

In order to prevent the above opportunities for inaccuracy in leg-setting and also to provide for comparisons of inside and outside dimensions in a speedy manner and without the need of employing a scale as a gauge for setting caliper legs, it is the principal object of the present invention to provide a combined inside and outside, or double, caliper construction characterized by the fact that the spacing between the work-contact ends of the outside calipering legs, for example, always equals the spacing between the work-contact ends of the inside calipering legs, and vice versa, regardless of the angular position of the body members of the construction relatively to each other.

To the accomplishment of this object and of such others as may hereinafter appear, the various features of the present invention reside in certain constructions, combinations, and arrangements of parts, all fully set forth hereinafter and then pointed out in their true scope in the appended claims, possessing advantages which will be readily apparent to those skilled in the art.

The various features of the present invention will be readily understood from reading this specification in the light of the accompanying drawing which illustrates the best forms of the invention at present known to the inventor and in which:

Fig. 1 is a view of a preferred embodiment of the present invention, this embodiment being shown associated with a construction line circle and intersecting diameters thereof to bring out the principle of the present invention;

Fig. 2 is a detail view in side elevation showing the structure of the central portions of the Fig. 1 body members and one means of pivotally connecting them together;

Fig. 3 is an enlarged detail view in elevation of the outside dimension work-contact end portion of one of the caliper legs in Fig. 1, this view being taken along the line 3—3 of that figure;

Fig. 4 is an enlarged detail view in elevation of the inside dimension work-contact end portion of one of the caliper legs in Fig. 1, this view being taken along the line 4—4 of that figure;

Fig. 5 is a detail view of an alternative structure for the central portions of the body members, their pivotal connection also being shown;

Fig. 6 is a view in plan of a modified form of caliper construction embodying the present invention, this embodiment also being shown associated with a construction line circle and intersecting diameters thereof;

Fig. 7 is an enlarged detail view in elevation, taken along the line 7—7 of Fig. 6, of the outside dimension work-contact end portion of one of the caliper legs of that figure; and Fig. 8 is an enlarged detail view in elevation, taken along the line 3—3 of Fig. 6, of the inside dimension work-contact end portion of one of the caliper legs of that figure.

With reference to the drawing, there is shown in construction line in Fig. 1 a circle X having two diameters A—D and B—C intersecting at a point P which is the center of the circle. As is well understood, any two intersecting diameters of a circle subtend equal oppositely disposed chords, so that the chords A—B and C—D are equal. It is upon this principle of plane geometry that the present invention is founded.

With further reference to Fig. 1, the caliper construction there shown is provided with body members 10 and 11 shown merely for illustrative purposes and not by way of limitation as being flat and of the same thickness (Fig. 2) and having recessed central portions 12 and 13, respectively, the depth of each of which is one half the thickness of the body member in which it is located. The two central portions 12 and 13 have flat bottoms in engagement and are provided with registrable openings for the reception of a pivot screw 14 (Figs. 1 and 2) the flat head of which abuts the under face of the body member 11 and the shank of which extends through the openings in the two central portions for the reception of a knurled clamp nut 15 which abuts the body member 10 so that the two body members are pivotally connected and may be clamped in any desired position of angular adjustment relatively to each other. The axis of the shank of the screw 14 is the axis about which the body members swing relatively to each other, and the axis of the shank of the screw 14 is also the center P of the circle X, as shown in Fig. 1.

To one side of the axis P the body members 10 and 11 are provided with legs 16 and 17, respectively, which curve divergingly from the axis P and then curve convergingly so that their free ends may function for outside calipering, i. e., for engaging the exterior of an object to gauge or measure an outside dimension thereof. As indicated in both Figs. 1 and 3, the leg 16 terminates in a tapered portion 18 so as to provide a work-contact locus which is an edge 19, and it will be seen from Fig. 1 and understood from Fig. 3 that the leg 17 terminates in a corresponding tapered portion 20 having a work-contact locus which is an edge 21 corresponding to the edge 19.

To the other side of the pivot axis P the body members 10 and 11 are provided with legs 22 and 23, respectively, which have their free ends disposed away from each other to function for inside calipering, i. e., for engaging the interior of an object to gauge or measure an inside dimension thereof. As indicated in both Figs. 1 and 4, the leg 22 terminates in a tapered end portion 24 of pyramidal formation so as to provide a work-contact locus which is a point 25, and it will be seen from Fig. 1 and understood from Fig. 4 that the leg 23 terminates in a corresponding tapered end portion 26 having a work-contact locus which is a point 27 corresponding to the point 25. Of course the end portions 24 and 26 could be tapered in a manner corresponding to the tapered end portions 18 and 20 of the respective legs 16 and 17 so as to have work-contact loci which are edges, but this pyramidal construction for the end portions of the legs 22 and 23 is preferred, since in calipering the inside wall of a cylinder, for example, work-contact loci which are edges, corresponding to the edges 19 and 21, for example, would chord across the wall and be spaced from the diameter intended to be gauged or measured.

On the other hand, the tapered end portions 18 and 20 of the legs 16 and 17, respectively, could be constructed as are the leg end portions 24 and 26, and for some uses, such as engagement with a flat surface, this construction may be desirable, but for the gauging or measuring of the diameter of a shaft, for example, the leg edges 19 and 21 would be tangential to the cylindrical exterior of the shaft, so that for such use it is not necessary that the end portions of the legs 16 and 17 terminate in points.

Referring again to Fig. 1 to illustrate the application of the above geometric principle to the particular embodiment of the present invention there shown, it will be noted that in addition to the axis P of the shank of the screw 14 being the center of the circle X and the pivot axis of the body member 10, the work-contact edge 19 and the work-contact point 25 of the body member 10 are at the opposite ends of the diameter A—D of the circle X, so that the edge 19, the point 25, and the pivot axis P all are located on the same straight line, with the point P being equidistant from the edge 19 and the point 25, i. e., midway between them. It will also be noted that in addition to the axis P of the shank of the screw 14 being the center of the circle X and the pivot axis of the body member 11, the work-contact edge 21 and the work-contact point 27 of the body member 11 are at the opposite ends of the diameter B—C of the circle X, so that the edge 21, the point 27, and the pivot axis P all are located on the same straight line, with the pivot P equidistant from the edge 21 and the point 27, i. e., midway between them. The distances between the pivot axis P and each of the edges 19 and 21 and each of the points 25 and 27 are therefore equal, and because of this equality plus the the fact that the edge 19 and the point 25 of the body member 10 are located on a diameter which necessarily intersects the pivot axis P while the edge 21 and the point 27 of the body member 11 are located on a diameter which also necessarily intersects the pivot axis P, the spacing between the work-contact edges 19 and 21 will always be equal to the spacing between the work-contact points 25 and 27, and vice versa, regardless of the angular position of the body members 10 and 11 relatively to each other.

In view of the foregoing remarks, it will be seen that a caliper construction embodying the present invention is capable of performing all the operations performable with ordinary combined inside and outside, or double, calipers, or performable with separate inside and outside calipers, but that in addition a caliper construction embodying the present invention is useful where, very broadly speaking, it is desired accurately and rapidly to compare an outside dimension of an object with an internal dimension of another object in which the first object is to fit. A few examples of such comparisons are the width of a slide having parallel flat sides and the ways in which the slide is to move; the diameter of the piston of an engine and that of the engine block cylinder in which the piston is to reciprocate; the diameter of a shaft and that of a bore of a bearing in which the shaft is to fit and rotate; and the diameter of an axle end and that of the bore of a wheel hub, or a gear, or the like which is to receive the axle end, whether fast therein or rotatably. The setting (spacing) of the leg end portions 18 and 20 automatically gives an identical setting (spacing) for the leg end portions 24 and 26, and the setting (spacing) of the leg end portions 24 and 26 automatically gives an identical setting (spacing) for the leg end portions 18 and 20, so that accurate comparisons may be made speedily and without resort to the use of a scale, i. e., an additional tool, and reliance upon eyesight with respect to such a scale, in order to effect equality of spacing between the inside calipering and the outside calipering work-contact loci.

So far as the pivotal mounting of the body members 10 and 11 is concerned, the Fig. 1 embodiment of the present invention is characterized by the members being of equal thickness and by the recessed portions 12 and 13 each having a depth equal to one half of that thickness so that the work-contact edges 19 and 21 will always be in registry and so that the work-contact points 25 and 27 will always be in registry.

The same result may be achieved in an alternative construction such as shown in Fig. 5, in which the body member 28 corresponds to the Fig. 1 body member 11 but is shown as of flat construction having the same thickness throughout its length, while the body member 29, which corresponds to the Fig. 1 body member 10, is also shown as of the same material thickness as the body member 28 but has an inverted (viewing Fig. 5) transverse channel-shaped central portion 30 the elevation of the recessed or flat under part of which is the same as the thickness of the material of the body member 28. With this construction the under faces (viewing Fig. 5) of the body members 28 and 29 lie in a plane, as do their top faces except for the channel-shaped portion 30, and as the body members 28 and 29 are otherwise identical as a whole with the respective body members 11 and 10 in Fig. 1, the work-contact edges and the work-contact points of an embodiment constructed as in Fig. 5 would be in registry, respectively. In an embodiment such as shown in Fig. 5 there may be employed, in a manner corresponding to Fig. 1, openings in the channel-shaped central portion 30 and in the central portion of the body member 28 engaged flatwise therewith for the reception of the pivot axis screw 14 and the mounting of the knurled clamp nut 15 thereon, and since the body members 28 and 29 have identical structure with the respective body members 11 and 10 of Fig. 1, except for their central portions as noted above, it will be seen that the geometric principle applied to the Fig. 1 construction is also present in an embodiment made according to the disclosure of Fig. 5, so that there will always be the same equality of spacing between the work-contact edges and the work-contact points, as set forth above, regardless of the angular adjustment of the body members 28 and 29 relatively to each other.

A third alternative construction is shown in Figs. 6, 7, and 8, and with reference to Fig. 6 this embodiment is provided with body members 31 and 32 which are identical in shape and pivotal mounting with the body members 10 and 11 in Fig. 1 with the two exceptions that the body members 31 and 32 are not recessed or channelled but have oppositely disposed flat faces throughout their lengths so that the under planiform face of the body member 31 (viewing Fig. 6) engages flatwise the upper planiform face of the body member 32, and that the end portions of the legs are different than as shown in Fig. 1.

The caliper legs 33 and 34 in Fig. 6 are provided with tapered end portions 35 and 36, respectively, which, in addition to having tapered sides as have the Fig. 1 leg end portions 18 and 20, are each tapered in the direction of their free ends from their outer face to their inner face so as to provide work-contact loci points 37 and 38, respectively, for the performance of outside dimension calipering, as referred to above. To the same end, the caliper legs 39 and 40 in Fig. 6 are provided with corresponding tapered end portions 41 and 42, respectively, to provide work-contact loci points 43 and 44 for the performance of inside dimension calipering, as referred to above. The tapered end portions 35 and 41 of the Fig. 6 legs 33 and 39, respectively, are illustrated in detail in Figs. 7 and 8, and since the body member 31 having these tapered end portions 35 and 41 is the uppermost one in Fig. 6, the tapered end portions 35 and 41 are there indicated by means of full lead lines. It will be understood that the tapered end portions 36 and 42 on the respective legs 34 and 40 of the body member 32 have the same construction as have the end portions 35 and 41, but since these end portions 36 and 42 are on the under side (viewing Fig. 6) of the body member 32, they are indicated in Fig. 6 by means of construction lead lines.

The Fig. 6 embodiment has the body members 31 and 32 pivotally connected together by means of a pivot axis screw 14' and a knurled nut 15' corresponding in structure and in location to the screw 14 and knurled nut 15 shown in Figs. 1 and 5, and since the body members 31 and 32 are identical with those shown in Fig. 1 with the two exceptions noted above, it will be seen from comparison of the Fig. 6 associated circle X' and its intersecting diameters A'—D' and B'—C' with the circle X and its intersecting diameters A—D and B—C associated with the Fig. 1 construction that the geometric principle set forth above is embodied in the Fig. 6 construction so that the spacing between the work-contact points 37 and 38 is always equal to the spacing between the work-contact points 43 and 44, and vice versa, regardless of the angular position of the body members 31 and 32 relatively to each other. The axis P' of the screw 14' in Fig. 6 is the center of the circle X'.

For purposes of disclosure only and not by way of limitation the above-described constructions have been shown in the drawing with the body members pivotally connected together by means of a flat headed screw and a knurled clamp nut. Any suitable screw and nut combination, or even a rivet, may be used as a substitute, and instead of providing a pivotal connection of this "firm joint" type, it is contemplated that the well known "lock joint" connection be employed for holding the legs in a fixed adjusted position, care being taken to locate the pivotal axis of such a joint where the pivot axes P or P' are located with respect to the circles X or X' and to the associated caliper body members. It is also within the scope of the present invention and it is contemplated that there be employed with the embodiments shown a leg screw adjustment for making a close calibration, such a screw adjustment being cooperable with a spring resistance as is found in some calipers, or not employing a spring resistance. It is also within the scope of the present invention to employ with the embodiments shown a scale and mark arrangement, such as is sometimes employed on compasses, this construction comprising an arcuate arm having one end mounted on one of the caliper legs and extending over the other caliper leg at the same side of the pivot as the first so that a mark on the latter leg may cooperate with a scale on the arcuate arm to indicate the amount of spacing between the two leg end portions with which these elements are associated. Such an arrangement would obviously indicate, for an embodiment of the present invention, the spacing between both the inside calipering leg end portions and the outside calipering leg end portions since by the present invention such spacings are necessarily equal.

Nothing herein explained is to be interpreted as limiting the present invention, as compared to particular physical embodiments thereof, in the scope of its application to use in connection with the particular structural details herein selected for purposes of explanation and illustration. The particulars of construction herein set forth are well suited to the particular physical embodiments of the invention which have been shown, but the invention is not limited either to these features conjointly or to these particulars, and it is to be understood that they may be variously modified within the skill of the artisan without departing from the true scope of the actual invention, characterizing features of which are set forth in the following claims.

What is claimed as new is:

1. A caliper construction characterized by a pair of body members pivotally connected together and shaped to provide outside calipering legs each having a work-contact locus at one side of the axis of pivoting and inside calipering legs each having a work-contact locus at the opposite side of the axis of pivoting, the pivot axis being equidistant from the work-contact loci on each body member, the work-contact loci on each body member and the pivot axis of said body member being located on a straight line, the work-contact loci on at least the outside calipering legs comprising edges, one of said body members being flat and the other of said body members having a transverse channel-shaped portion for receiving the first body member flatwise for pivotal connection thereto, and the recessed part of said channel-shaped portion having an elevation equal to the thickness of said first body member whereby the work-contact loci at each side of the pivot axis are in registry.

2. A caliper construction characterized by a pair of body members pivotally connected together and provided with flat engaged face portions at least adjacent the axis of pivoting, said body members being shaped to provide outside calipering legs each having a work-contact locus at one side of the axis of pivoting and inside calipering legs each having a work-contact locus at the opposite side of the axis of pivoting, the pivot axis being equidistant from the work-contact loci on each body member, the work-contact loci on each body member and the pivot axis of said body member being located on a straight line, the work-contact loci on at least the outside calipering legs comprising edges, one of said body members being flat and the other of said body members having a transverse channel-shaped portion for receiving the first body member flatwise for pivotal connection thereto, and the recessed part of said channel-shaped portion having an elevation equal to the thickness of said first body member whereby the work-contact loci at each side of the pivot axis are in registry.

3. A caliper construction characterized by a pair of body members pivotally connected together and shaped to provide outside calipering legs each having a work-contact locus at one side of the axis of pivoting and inside calipering legs each having a work-contact locus at the opposite side of the axis of pivoting, the pivot axis being equidistant from the work-contact loci on each body member, the work-contact loci on each body member and the pivot axis of said body member being located on a straight line, one of said body members being flat and the other of said body members having a transverse channel-shaped portion for receiving the first body member flatwise for pivotal connection thereto, and the recessed part of said channel-shaped portion having an elevation equal to the thickness of said first body member whereby the work-contact loci at each side of the pivot axis are in registry.

4. A caliper construction characterized by a pair of body members pivotally connected together and shaped to provide outside calipering legs each having a work-contact locus at one side of the axis of pivoting and inside calipering legs each having a work-contact locus at the opposite side of the axis of pivoting, the pivot axis being equidistant from the work-contact loci on each body member, the work-contact loci on each body member and the pivot axis of said body member being located on a straight line, the work-contact loci on at least the inside calipering legs comprising points, one of said body members being flat and the other of said body members having a transverse channel-shaped portion for receiving the first body member flatwise for pivotal connection thereto, and the recessed part of said channel-shaped portion having an elevation equal to the thickness of said first body member whereby the work-contact loci at each side of the pivot axis are in registry.

5. A caliper construction characterized by a pair of body members pivotally connected together and shaped to provide outside calipering legs each having a work-contact locus at one side of the axis of pivoting and inside calipering legs each having a work-contact locus at the opposite side of the axis of pivoting, the pivot axis being equidistant from the work-contact loci on each body member, the work-contact loci on each body member and the pivot axis of said body member being located on a straight line, the work-contact loci on the outside calipering legs comprising edges and the work-contact loci on the inside calipering legs comprising points, one of said body members being flat and the other of said body members having a transverse channel-shaped portion for receiving the first body member flatwise for pivotal connection thereto, and the recessed part of said channel-shaped portion having an elevation equal to the thickness of said first body member whereby the work-contact loci at each side of the pivot axis are in registry.

DWIGHT H. SAYWARD.